United States Patent Office 3,143,016
Patented Aug. 4, 1964

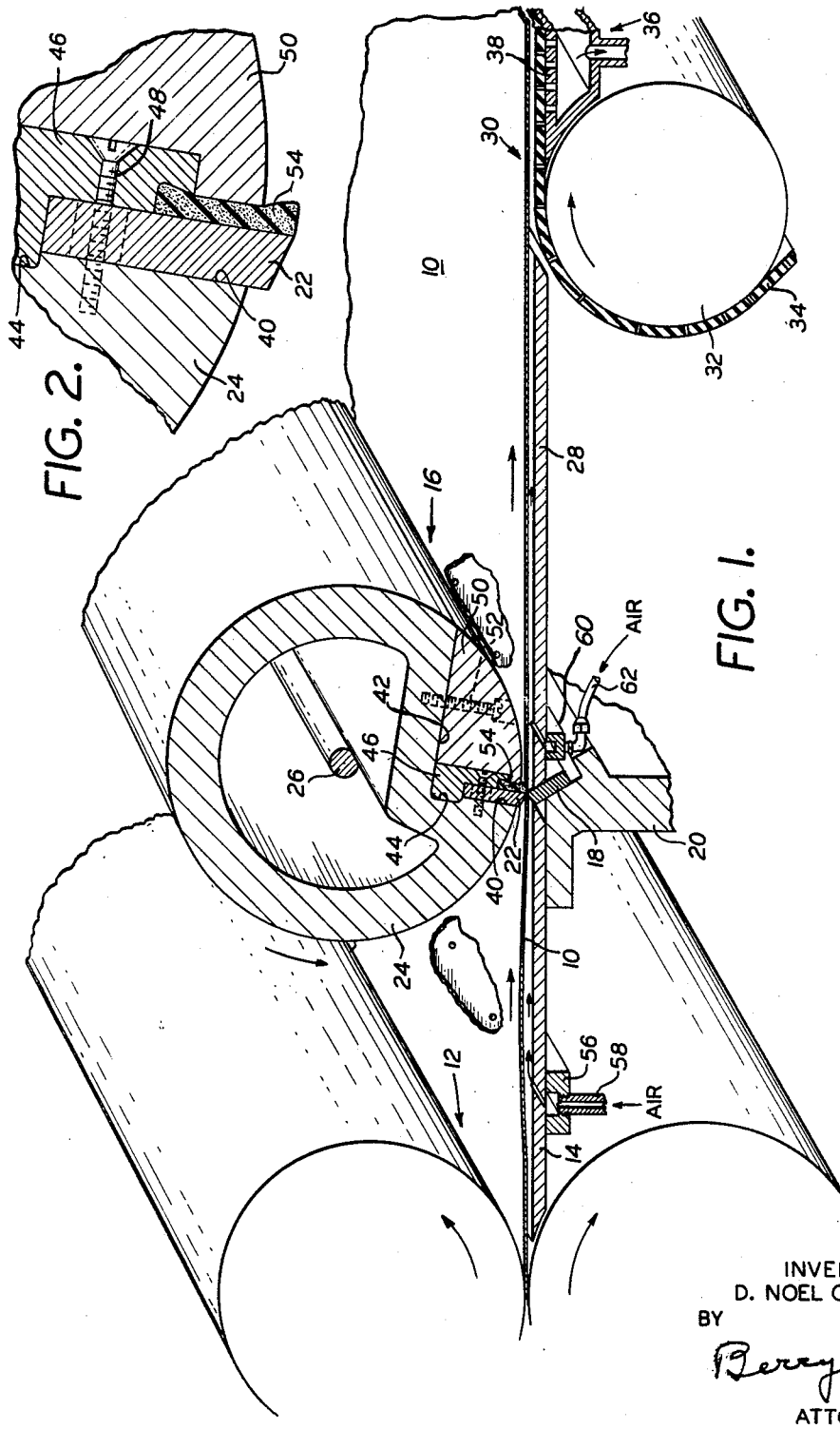

3,143,016
WEBCUTTING MECHANISM WITH FORCED AIR WORK AND PRODUCT TRANSFER MEANS
David Noel Obenshain, Luke, Md., assignor to West Virginia Pulp and Paper Company, New York, N.Y., a corporation of Delaware
Filed Dec. 28, 1960, Ser. No. 79,053
4 Claims. (Cl. 83—98)

This invention relates to the cutting of web material consistently and precisely, at high speed, into sheets of one of a wide variety of selected lengths, by means of a flying cutter.

While single web cutting by means of a flying cutter is not new, it has long been a prevailing practice for paper manufacturers to feed a multiplicity of webs through a flying cutter in superposed relation, for cutting a series of sheets simultaneously from the leading ends of the webs. This has had the advantage that a high rate of output can be achieved even when advancing the web and operating the cutter at moderate speeds.

Multiple web cutting has a number of disadvantages, however, including the following:

(1) Consecutive sheets of the resulting stack of cut sheets are not taken from the same web, and hence there is frequently a considerable variation from sheet to sheet in appearance and printability;

(2) The sheets are raggedly cut with the production of considerable lint, and dust which lint and dust collect on the top face of the uppermost sheet of each group and the bottom face of the bottom sheet of the group, and interfere substantially with the securement of high quality printing;

(3) The sheets produced at each cutting vary considerably in length and are likely to have fuzzy edges, so that it has been common practice to edge trim the sheets for equalizing the lengths and for sharpening the edges, and this has involved extra handling as well as substantial waste of paper;

(4) No way of inspecting the individual sheet lengths as an incident of cutting could be contrived, and hence inspection after cutting had to be resorted to, this procedure being tedious and laborious and providing a far from satisfactory classification.

It has been ascertained that through resort to single web cutting and other features of improvement, these drawbacks can all be overcome, the sheets associated in a stack being all derived from the same web, being all sharply cut without fuzz or lint, being all so nearly the same length that no subsequent trimming is required, and being susceptible of automatic inspection, classification and sorting as an incident of the cutting operation.

These advantages are extremely desirable, but in order to realize them to the full, it is important that the rate of web feeding and cutting be greatly increased as compared with the rates heretofore employed in multiple web cutting and in single web cutting.

It is well-known that with the rotary blade of a flying cutter operating at a chosen uniform rate of travel, the web may be fed for cutting at any chosen linear speed which is below the linear speed of the rotary blade. If there is to be any substantial variation of sheet lengths available, however, the linear speed of the rotary blade will greatly exceed the rate of web feed when the shorter sheets are being cut. Even for a selected sheet length the difference of speed of the rotary blade and the web increases in direct proportion with increase in the rate of sheet output.

In attempting to develop a high speed single web cutter, I have pushed up the speed of a conventional flying cutter progressively in the range between three hundred feet per minute and one thousand feet per minute. It was soon discovered that the rotary blade caught behind the trailing edge of each severed sheet and threw or kicked it forward and upward into the air, thus interfering with the orderly advance of the cut sheets.

Various expedients were tried in an attempt to eliminate this fault until finally a sheet freeing strip of sponge rubber was mounted in contact with the leading face of the rotary blade. When applied, the sponge rubber strip was caused to protrude beyond the cutting edge of the rotary blade. At the first crossing of the stationary blade by the sponge rubber strip and the rotary blade, the strip was automatically trimmed back substantially flush with the cutting edge of the rotary blade, and functioned perfectly thereafter to prevent the catching and throwing forward of the cut sheet by the blade. The inclusion of such a sheet freeing strip in the cutter is an important feature of the present invention.

After the blade kick problem had been solved as explained above, an attempt was made to go on up to higher speeds, but trouble then developed in that the web was not disposed to advance smoothly over stationary, horizontal supporting tables or bridge plates which preceded and followed the cutter. It was thought that this difficulty might be corrected by blowing air down and forward onto the top of the web as the web approached the cutting point, but when this expedient was tried it was found to have just the opposite effect from that intended. The sheet, instead of sliding on across the supporting table to the field of action of the following sheet conveyor, tended to wrap around the cutting drum.

It was then reasoned that if the blowing of air between the web and the drum caused the web to follow the drum, blowing of air between the web and the table might conceivably induce the web to travel along the table smoothly. The scheme was tried without any serious hope of success, but the result was surprisingly successful. The sheet followed the table surfaces to and past the cutter without any tendency to rise or bubble. By providing sets of jets across the table ahead of and after the cutter, it was found possible to cause the web to travel over the tables and into the field of action of the sheet conveyor at one thousand feet per minute under perfect control.

The principle of this phenomenon was not immediately apparent, but a study showed it to be a result of the well-known Bernoulli principle of fluid flow. The high velocity of the air flow beneath the web so reduces the lateral pressure against the lower face of the web that the atmospheric pressure on top of the web can consistently push the web down nearly to the underlying table and consistently hold it there. The air film beneath the web provides a thin, friction-free air cushion for the web to ride upon.

Other objects and advantages will hereinafter appear.

In the drawing forming part of this specification—

FIG. 1 is a fragmentary perspective view, partly broken away, of a flying cutter and associated structure in which features of the invention are practically and advantageously embodied; and FIG. 2 is a fragmentary sectional view, on a larger scale than FIG. 1, of the rotary cutter blade of FIG. 1 together with other components of the cutter drum assembly.

In the illustrative mechanism of FIG. 1, a paper web 10 is drawn at uniform speed from a reel (not shown) past an inspection device (not shown) and is thrust forward by a feed couple 12 across a first table or bridge plate 14 toward and beyond a flying cutter 16.

The flying cutter 16 comprises a fixed blade 18 which is rigidly attached to a stationary support 20 and a rotary blade 22 which is mounted in fixed position on a rotary drum 24. The drum 24 is carried on a drive shaft 26, which shaft turns through one complete revolution for each cutting operation performed. The feed couple 12 thrusts the web forward at a lower linear speed than that at which the cutting edge of the rotary blade 22 travels, the rate of web feed being so chosen that a sheet of precisely the chosen length will be cut from the leading end of the web 10 each time that the rotary blade 22 crosses the stationary blade 18.

The arrangement is such that the leading end of the web will be advanced past the cutter, across a stationary table or bridge plate 28, and onto a suction conveyor 30 between successive cutting operations, even when the sheets cut are of minimum length. The suction conveyor comprises a pair of end drums 32 (one shown), a perforate endless belt 34 which is driven by one of the drums, and a suction box 36 beneath the belt, the upper, horizontal wall of which constitutes a stationary, perforated slide plate 38 upon which the traveling belt 34 is supported.

The drum and cutter blade assembly is in the main of conventional construction. The drum 24 is formed from end to end with a generally rectangular pocket or notch, which pocket has a radial wall 40 and a wall 42 at right angles to the wall 40. The wall 42 is formed with a recess 44 at its inner end to receive a shouldered enlargement of a clamping block 46. Clamping screws 48 (one shown) are passed through the clamping block 46 and the blade 22, and are threaded into the drum 24 for securing the blade firmly in place. A filler block 50 is removably secured in the pocket by screws 52 (one shown).

It is a salient feature of novelty that a sponge rubber strip 54 is secured between the outer margin of the leading face of the blade 22 on the one hand, and the clamping block 46 and the filler block 50 on the other. The strip 54, in an unstrained condition, is desirably about one-quarter inch thick and one inch wide, and it extends throughout the length of the blade 22. The strip 54 may be fixed in place by adhesion to the blade 22 and/or to the clamping block 46, or in any other suitable way. When first applied the strip 54 protrudes beyond the edge of the blade 22. On the first revolution of the drum, however, the blades 18 and 22 coact to trim off the strip 54 substantially flush with the cutting edge of the blade 22. It is not essential that the sheet freeing strip 54 be composed of rubber. It may be composed of any material which is soft and resilient and capable of pushing a severed sheet clear of the blade edge.

For blowing air under the web as it travels across the table 14 toward the cutting point, a transversely disposed, channeled bar 56, having its channeled side faced toward the under side of the table, is secured to the table in an air tight manner so that the bar 56 and the table 14 jointly form a compressed air manifold. A source of compressed air (not shown) is maintained in communication with the manifold through a conduit 58. At uniform intervals, say of four inches, the table is formed with forwardly extending one-sixteenth inch bores which incline upward at a uniform slope of the order of 30°.

Similarly a channeled bar 60 is combined with the table 28 to form a compressed air manifold, the source of compressed air being maintained in communication with the manifold through a conduit 62. The table 28 is similarly provided with evenly spaced, forwardly and upwardly extending bores for discharging the air at high velocity under the leading end of the web.

While a preferred embodiment of the invention has been illustrated and described in detail, it is to be understood that changes may be made therein and the invention embodied in other structures. It is not, therefore, the intention to limit the patent to the specific construction illustrated, but to cover the invention broadly in whatever form its principle may be utilized.

I claim:

1. In a rotary web cutter including a stationary cutting blade, a rotary cutter drum, a rotary cutting blade carried in fixed position on the drum and cooperating with the stationary blade to form a cutting zone in which a traveling web is severed, feed rolls spaced forwardly from the cutting zone for advancing the traveling web into the cutting zone, a first bridge plate bridging the span between the feed rolls and the cutting zone, and a second bridge plate following the cutting zone, said rotary web cutter characterized by the fact that said first bridge plate has a transversely extending row of upwardly and forwardly inclined air passages through it, and further characterized by the fact that said second bridge plate has a transversely extending row of upwardly and forwardly inclined air passages through it, said air passages in said first and second bridge plates directing air at high velocity between said bridge plates and the traveling web, in severed or unsevered condition, to so reduce the lateral pressure against the lower face of the web that atmospheric pressure above the web forces the web toward the bridge plates.

2. In a rotary web cutter including a stationary cutting blade, a rotary cutter drum, a rotary cutting blade carried in fixed position on the drum and cooperating with the stationary blade to form a cutting zone in which a traveling web is severed, feed rolls spaced forwardly from the cutting zone for advancing the traveling web into the cutting zone, and a flat bridge plate bridging the span between the feed rolls and the cutting zone, said rotary web cutter characterized by the fact that said bridge plate has a transversely extending row of upwardly and forwardly inclined air passages through it for directing a current of high velocity air between said bridge plate and the traveling web to so reduce the lateral pressure against the lower face of the web that atmospheric pressure above the web forces the web toward the bridge plate.

3. In a rotary web cutter including a stationary cutting blade, a rotary cutter drum, a rotary cutting blade carried in fixed position on the drum and cooperating with the stationary blade to form a cutting zone in which a traveling web is severed, and a flat bridge plate following the cutting zone for conducting the web, in severed or unsevered condition, away from the cutting zone, said rotary web cutter characterized by the fact that said bridge plate has a transversely extending row of upwardly and forwardly inclined air passages through it for directing a current of high velocity air between said bridge plate and the traveling web to so reduce the lateral pressure against the lower face of the web that atmospheric pressure above the web forces the web toward the bridge plate.

4. In a rotary web cutter including a stationary cutting blade, a rotary cutter drum, a rotary cutting blade carried in fixed position on the drum and cooperating with the stationary blade to form a cutting zone in which a traveling web is severed, feed rolls spaced forwardly from the cutting zone for advancing the traveling web into the cutting zone, a flat bridge plate between the feed rolls and the cutting zone, and a flat bridge plate following the cutting zone for conducting the traveling web, in severed or unsevered condition, away from the cutting zone, said rotary cutter characterized by the fact that at least one of said bridge plates has therethrough a transversely extending row of air passages inclined in the direction of web travel at about 30° from the horizontal for directing a current of high velocity air against the lower face of the traveling web and between the bridge plate and the traveling web to so reduce the lateral pressure against the lower face of the web that atmospheric pressure above the web forces the web toward the bridge plate.

References Cited in the file of this patent

UNITED STATES PATENTS

| | | |
|---|---|---|
| 1,678,896 | Wood | July 31, 1928 |
| 1,738,076 | Molins | Dec. 3, 1929 |
| 2,219,682 | Doble | Oct. 29, 1940 |
| 2,338,132 | Sandberg | Jan. 4, 1944 |
| 2,518,960 | Tollison et al. | Aug. 15, 1950 |
| 2,736,380 | Dillenburger | Feb. 28, 1956 |
| 2,981,411 | Azari | Apr. 25, 1961 |